April 24, 1945.    W. J. MILLER    2,374,554
APPARATUS FOR FEEDING CLAY TO MOLDS
Original Filed Dec. 2, 1941    3 Sheets-Sheet 3

INVENTOR.
WILLIAM J. MILLER
BY George J. Croninger
ATTORNEY.

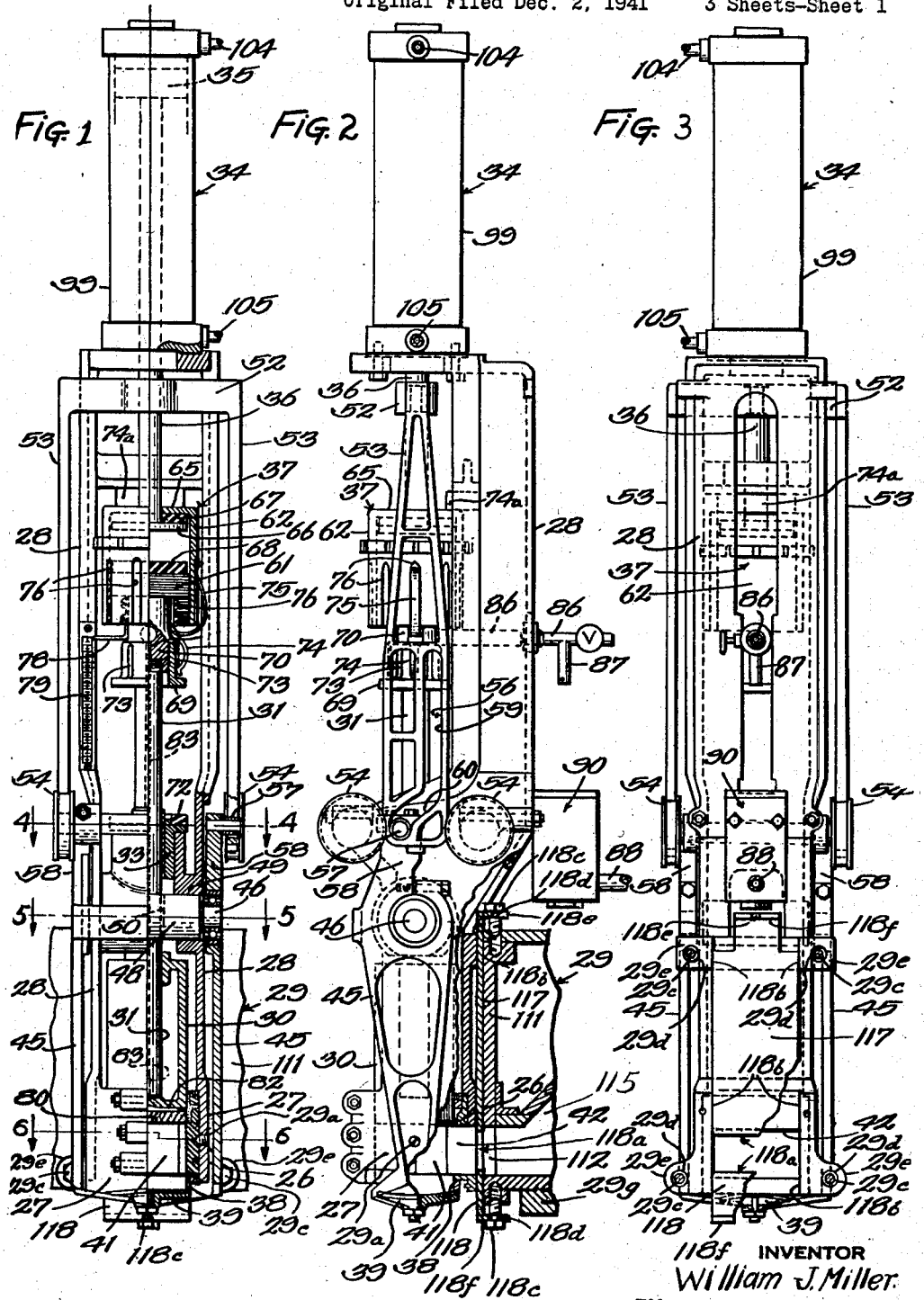

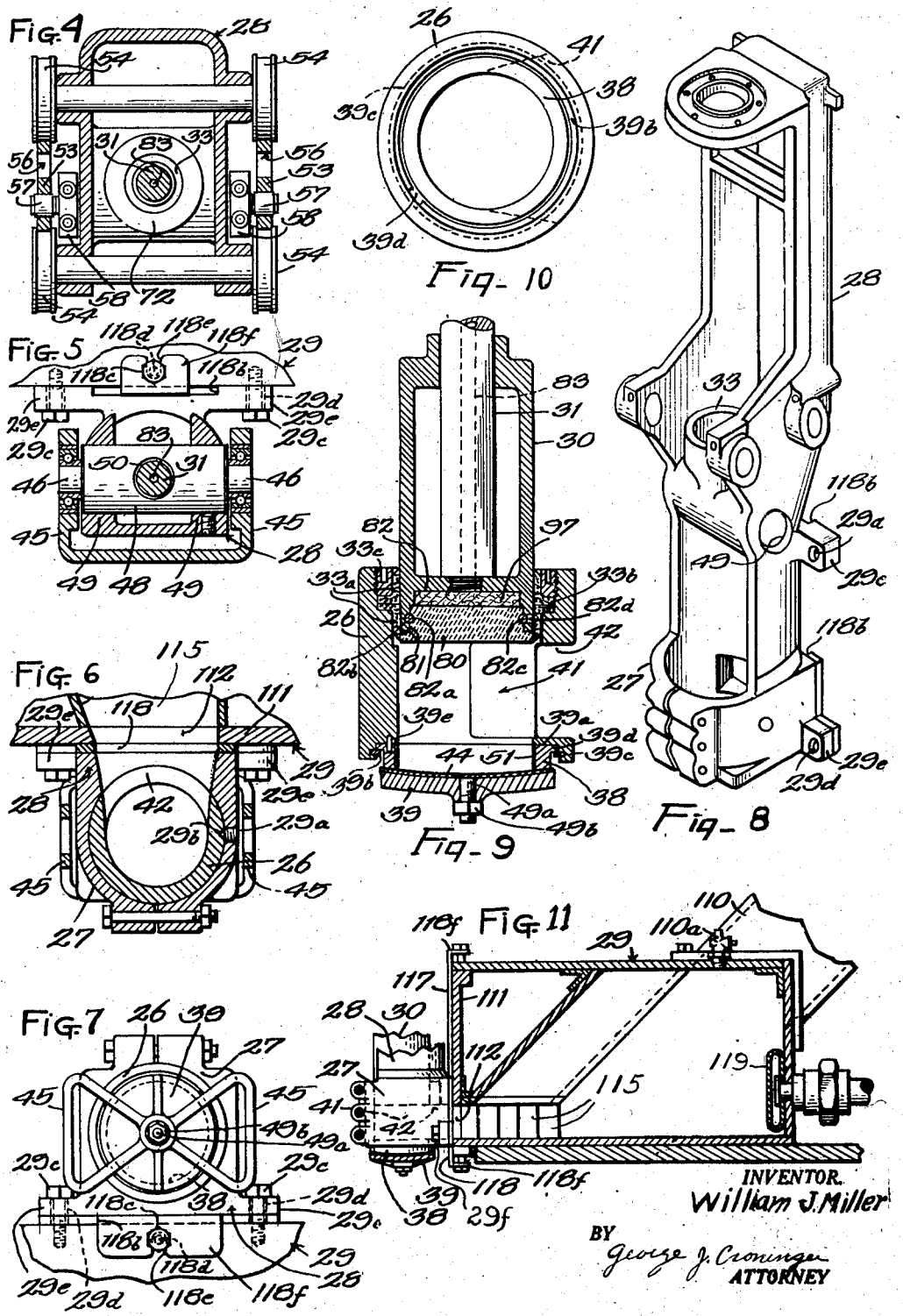

Patented Apr. 24, 1945

2,374,554

UNITED STATES PATENT OFFICE 2,374,554

APPARATUS FOR FEEDING CLAY TO MOLDS

William J. Miller, Swissvale, Pa., assignor to Miller Pottery Engineering Company, Swissvale, Pa., a corporation of Pennsylvania Original application December 2, 1941, Serial No. 421,299. Divided and this application April 20, 1943, Serial No. 483,721

26 Claims. (Cl. 25—1)

This invention relates to apparatus for the manufacture of potteryware. It has to do particularly with feeding charges of plastic ceramic material to molds in the production of jiggered ware.

This application is a division of my co-pending application Serial No. 421,299 filed December 2, 1941.

Heretofore, plastic jiggering clay has been mechanically fed to molds by apparatus operative to homogenize filter-pressed clay and deliver it to a manifold having outlets through which the clay is forced into delivery chambers. From these chambers, the clay is ejected, for instance, by a plunger, into or onto the molds. To homogenize and deliver the clay to the manifold, it is customary to use a conventional pug mill, but it has been found that the force delivered by the pug mill auger is variable and of insufficient value to quickly flow the clay into and completely fill the delivery and measuring chambers, particularly those most remote from the auger tip. Furthermore, the internal shape and design of the manifold has not been as highly efficient as it might be in promoting a flow of clay such that the delivery outlets would be quickly and completely filled. Owing to these factors, the rate of production and delivery of charges is not as great as it might be and one object of this invention is to increase the output of properly measured and proportioned charges within a given interval to thereby proportionately increase ware production. Another object is to affix the charge to the molding surface by pressing it thereagainst incident to deposit thereon, thus preventing dislodgement or displacement due to movement of the mold between stations.

According to my invention, I pug the clay in a conventional pug mill and deliver it to a manifold by means of the customary unreliable auger, however, I provide auxiliary positive and reliable impeller means for cooperating therewith periodically in applying controlled pressure to the clay in the manifold to cause the clay to reliably move, with greater rapidity than heretofore, into and completely fill the measuring chambers. The auxiliary force is applied only for such shortest practical intervals as is necessary to insure proper and complete filling of all measuring delivery chambers associated with the manifold.

The manifold represents an improvement in that it is designed to effect a more reliable and uniform flow and distribution of clay to the various outlets. The construction is such that during each feeding cycle of the apparatus, the capacity of the manifold is rapidly decreased to expedite the flow of clay through the outlets and then gradually, or otherwise, increased by force of clay inflow from the pug mill whereby the pug auger may rotate continuously instead of intermittently as in the systems of the prior art. As a result of this, the clay in the manifold will not only be maintained under pressure at all times, but the time usually lost in stopping and starting the pugmill as heretofore required, is saved. Besides this, by holding pressure on the clay, there is not time nor energy lost periodically building up a pressure head with which to start the clay flowing into the outlets.

The present clay feeding system is substantially closed to atmosphere and the clay is protected from air borne contamination and loss of moisture until it issues from the system in the form of a charge. Instead of the outlets of the delivery chamber being open at all times, as heretofore, in the present system, they are closed during at least the interval while the chambers and manifold are being filled. As a result, the clay is packed solidly into the delivery chamber to thereby insure the full bulk of clay in the charge. Furthermore, in that a certain amount of back pressure is applied to the clay in the manifold at all times, undue expansion of the clay is prevented as it moves into the manifold from the pug mill. This greatly eliminates the possibility of molecular separations in the clay which might promote the development of flaws and laps in the clay imparted thereto by the pug mill auger, particularly in the case of vacuumized clay.

In the drawings:

Fig. 1 is a front elevation, partly in section, of the preferred form of feeder.

Fig. 2 is a side elevation of the feeder of Fig. 1.

Fig. 3 is a rear elevation of the feeder of Fig. 1.

Fig. 4 is a horizontal section taken on the line 4—4 of Fig. 1.

Fig. 5 is a horizontal section taken on line 5—5 of Fig. 1.

Fig. 6 is a horizontal section taken on line 6—6 of Fig. 1.

Fig. 7 is a bottom plan view of the feeder of Fig. 1.

Fig. 8 is a perspective view of the feeder frame.

Fig. 9 is an enlarged vertical sectional elevation through the charge forming chamber showing the plunger and the closure for the chamber.

Fig. 10 is a bottom plan view looking into the charge forming chamber.

Fig. 11 is an enlarged detail vertical section showing how the feeder is attached to a clay supplying chamber.

Figure 13:
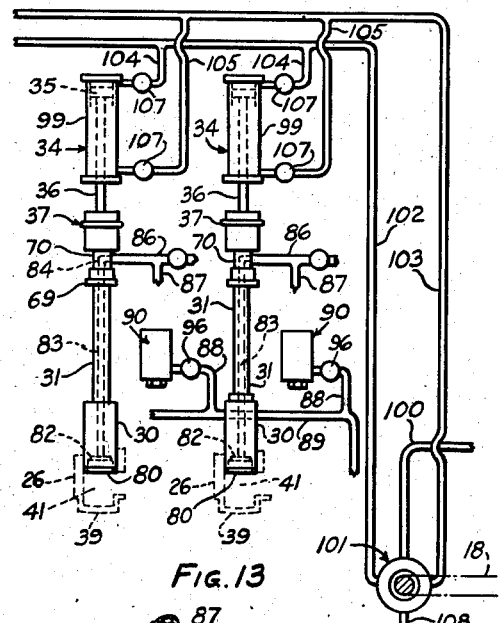
Fig. 13 is a piping diagram of a pneumatic system for operating the feeder plungers.
Figure 17:
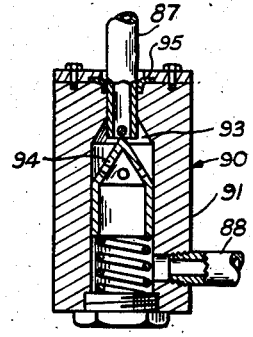
Figure 17 is a vertical section through one of the control valves associated with the fluid pressure system for operating the plungers.

Generally, each mold feeder includes a replaceable upright measuring and charging cylinder 26 (Fig. 9) from which a measured charge of the clay is forcefully deposited on to the center of the molding surfaces of the molds when same are raised by mold chucks. To this end, as seen in Figs. 1, 2 and 3, the charging cylinder 26 of each device is detachably mounted within a lower split bearing portion 27 of an upright frame 28, supported on a manifold 29 mounted on the machine frame. The cylinder 26 is held in proper angular position within the split bearing by a pointed set screw 29a threaded into the bearing wall and engaging in an indentation 29b in the cylinder wall. To permit slight adjustment of the cylinders into coaxial alignment with the mold chucks, each feeder frame is secured on the manifold by bolts 29c passing through oversize bolt holes 29d in bosses 29e of the frame, and the manifold is secured on the machine frame by bolts 29f which pass through oversize holes in the base portion 29g of the manifold. Operating within the charging cylinder 26 is a hollow charge-ejecting plunger 30 secured to the bottom end of a plunger rod 31 slidably supported in a bearing 33 of the charger frame 28. For providing a seal between the cylinder and plunger, the plunger operates within a pair of opposed flanged packing rings 33a held within an annular recess 33b in the top of the cylinder by a ring nut 33c threaded in the recess.

The plunger is reciprocated by a fluid-pressure operated motor 34 mounted on the top of the feeder frame and within which operates a piston 35 on a piston rod 36 which operates the plunger through a lost-motion connection 37 connecting same with the plunger rod 31 of the plunger.

At the bottom end of the charging cylinder 26 is detachably secured a nozzle 38 forming the charging outlet which is normally sealed by a movable closure or gate 39. The nozzle is detachably held within an annular recess 39a in the bottom end of the cylinder by a split ring 39b received within an annular groove 39c in the wall of the recess and engaging a flange 39d of the nozzle. The nozzle is held in proper position angularly with respect to the cylinder by a dowel-pin 39e cooperating therebetween. When the plunger is raised, the gate is closed to form with the bottom end of the plunger, a charge-measuring and delivery chamber 41 within the charging cylinder 26 which is provided with an inlet 42 in its side wall through which the clay is fed under pressure into the chamber from a manifold 29, Fig. 11, which has means therein to cause the clay to gush or surge forward expeditiously and uniformly into the chambers from the manifold.

The gate 39 has a replaceable facing 44 (see Fig. 9), and is connected between the bottom ends of a pair of levers 45 fulcrumed, as at 46, on the reduced ends of a cross-pin 48 supported in bearings 49 of the charger frame 28, the pin having a central enlarged opening 50 through which the piston rod 31 freely extends, as seen in Figs. 1, 2 and 5. The replaceable facing 44 of the gate and the outlet end of the nozzle 38 with which it cooperates to seal the measuring chamber are formed arcuately about the axis of the cross-pin 48 with a very slight clearance therebetween for venting the chamber as it is being filled with clay and to permit movement of the gate to open position after the chamber is filled. The facing 44 may be held on the gate by means of a threaded stud 49a extended through a central aperture in the gate and a nut 49b on the stud engaging the gate, or the facing may be cemented on the gate if desired.

Figure 14:
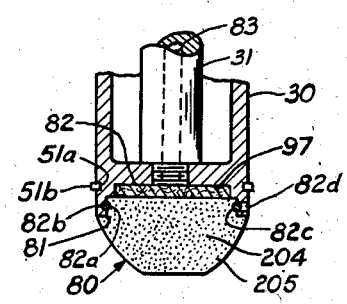
Fig. 14 shows a modified form of feeder plunger head.

The outlet nozzle 38 is slightly smaller in diameter than the measuring chamber 41 and has an inner lining 51 of an abrasive resistant material, such as an alloy of cobalt and chromium or nickel to insure a close fit with the feeder plunger to prevent a film of clay from forming on the side of the plunger as it passes through the nozzle during a charging operation and then being stripped from the plunger, as it raises, to fall onto the charges of clay and cause marks or imperfections in the finished ware. To insure that the measuring chamber and its nozzle will be thoroughly cleaned of clay by the plunger as it descends, the plunger may have an annular groove 51a near its bottom end within which may be provided a piston ring 51b of resilient material, such as rubber, for yieldably wiping the walls of the chamber and nozzle, as seen in Fig. 14.

The gate 39 is also operated by the fluid-pressure motor 34, which, through the lost-motion connection 37 and cam means, opens the gate before the feeder plunger is lowered thereby to expel a charge of clay, and whereby the gate will be closed as the plunger is finally raised. For this purpose, on the piston rod 36 of the fluid motor is secured a cross-piece 52 from whose ends depend, respectively, elongated cam members 53 guided for vertical reciprocation, with said rod, between rollers 54 pivoted on the feeder frame 28. In the cam members 53 are cam slots 56 within which operate rollers 57 pivoted on upward extensions 58 of the gate levers 45. The cam slots have an upper cam-dwell portion 59 terminating in a lower angular portion 60 arranged to swing the gate to open position immediately prior to the charging stroke of the feeder plunger, and to swing the gate to closed position immediately following the return stroke of the plunger, the lost motion connection 37 making possible the necessary plunger dwell periods between movements of the gate.

The lost-motion connection 37 (see Fig. 1), includes an exteriorly threaded head 61 on the top end of the plunger rod 31, threaded into the lower end of an internally threaded connector sleeve 62 which has a centrally apertured top-end wall 65 through which the piston rod 36 of the fluid motor freely extends with an enlarged disc-like head 66 thereon confined for limited reciprocable movement between bumpers 67 and 68 arranged, respectively, under the top of the sleeve and upon the said head.

The lowermost position of the feeder plunger is determined by an adjustable stop nut 69 threaded on a threaded stem portion 70 of the enlarged head 61, and which limits the downward movement of the plunger by engaging a resilient bumper ring 72 on the bearing 33 of the feeder frame 28. The stop nut is held in adjusted position by having a series of vertical indexing grooves 73 about its periphery within one of which may be engaged the free end of a resilient finger or spring 74 anchored to the stem portion 70. Generally, the upward movement of the plunger is limited by the connector sleeve 62 engaging a resilient bumper 74a on the feeder frame 28.

Also, the upper limit of movement of the plunger may be varied by rotating the connector sleeve 62 to raise or lower the head 61 and thereby regulate the capacity of the measuring chamber of the charging cylinder 26. For holding the connector sleeve 62 in adjusted position, one end of a resilient indexing finger 75 or spring, is anchored to the stem 70, the free end thereof being engageable within one of a series of vertical indexing grooves 76 formed about the periphery of the connector. Thus the uppermost limit of movement of the plunger may be determined independently of its lowermost limit which determines its approach to the molding surface of a mold to thereby define the thickness of the clay charge therebetween.

To visibly indicate the length of the cylindrical clay charge, the stem 70 of the enlarged head 61 of the plunger rod has an indicator 78 arranged in indicating relation to a vertical scale 79 arranged on the frame 28. To more accurately determine the length of the charges beyond that made possible by the scale, the adjustable stop nut 69 for each plunger serves as a vernier adjustment, as the indexing grooves therein are arranged thereabout and indicated thereon in sub-divisions of the smallest fractions of measurement of the scale.

As seen in Fig. 14, the plunger 30 of each feeder has a bottom-end portion 80 of permeable material through which air under pressure is directed during the final charge expelling movement of the plunger to repel the clay charge therefrom after it has been forced thereby onto a mold. To this end, the permeable end 80 of each plunger is in the form of a permeable disc which may be constructed of concrete, bronze or carborundum, and secured within a cavity 81 in the bottom of the plunger to form thereabove an air-pressure chamber 82 in the plunger. The disc is secured in the cavity by having an annular groove 82a registering with an annular groove 82b in the wall of the cavity to form an annular chamber within which is molded a locking ring 82c, of cement or solder, by way of a sprue 82d in the wall of the cavity. As seen in Figs. 1, 2 and 9, during the final downward movement of the plungers the pressure chambers 82 thereof are connected with a common source of air under pressure by way of a central passage 83 in each plunger rod, a passage 84 in the stem part 70 thereof, and a horizontal pipe section 86 extending therefrom with a depending inlet 87 which connects with a branch 88 (see Fig. 13) of a main air-pressure line 89 through a valve 90 which is arranged to be opened by the inlet during final downward movement of the plungers. The valves 90 each include a valve casing 91 connected at its bottom end with its respective branch 88 of the air pressure line, and in whose top end is a central outlet port 93 normally closed by a spring-pressed valve member 94 slidable in the housing. The valve is arranged so that as the inlet 87 of the pipe 86 is lowered, it enters the outlet port and opens same to establish connection therewith by depressing the valve member 94. A sealing ring 95 may be arranged in the outlet port 93 to provide a sealed connection between same and the inlet 87. To control the pressure of the air to be admitted through the valves 90 into the air-pressure chambers of the plungers, in each branch 88 of the main air-pressure line may be interposed a throttling valve 96 (see Fig. 13).

Instead of employing individual valves 90 for controlling the admittance of air pressure through the charger plungers, this may be accomplished by interposing a slide type shut-off valve in the air-pressure line 89 and operated by a cam 98 on the cross-shaft 18, as seen in Fig. 13. In this case, the air pressure line would have flexible branches connecting with the pipes 86 leading from the plunger rods, with a throttle valve 109 interposed in each pipe to regulate the flow of air through the plungers individually.

Confined in the air-pressure chamber 82 of each plunger (see Fig. 9) is a filter-pad 97 to prevent dirt or other foreign matter, that may come through from the main air-pressure line, from clogging the very minute openings in the permeable disc 80 of the plunger of contaminating any clay that may be adjacent thereto.

To determine the contour of the upper surface of a clay charge after it has been pressed by a plunger onto a mold, the charge-engaging surface of the permeable disc 80 of the plungers may be contoured accordingly, wherein it may be flat, as shown in Fig. 9, to accommodate a flat ware mold, or rounded, as seen in Fig. 14, to accommodate a hollow ware mold.

The fluid-pressure motors 34 are caused to actuate the charger plungers 30 when the molds are raised by the chucks 11, to effect the charging operations, by the opposite ends of the cylinder 99 of each motor being alternately connected with a main fluid pressure line 100 (see Fig. 13) by way of an ordinary continuously actuating four-way valve 101 from whose two opposite service ports continue conduits 102 and 103 connecting with the ends of the cylinders, respectively, through branch conduits 104 and 105. In each of these branch conduits may be a throttling valve 107 for controlling the flow of air into the motor cylinders in regulating the rate of reciprocation of the charger plungers. The valve 101 is of the ordinary rotary type whose rotor may be mounted on one end of the cross-shaft 18 to be constantly rotated thereby, the valve also having a vent port 108 to vent one end of the fluid motor cylinders when the fluid under pressure is admitted into the other end thereof.

The manifold 29 supplies clay to the measuring chambers of the various feeders through its several outlets and is designed to distribute the clay from a pug mill into the measuring chambers of the feeders.

Extending across the bottom portion of the front wall 111 of the manifold is a series of outlets 112 connecting with the inlets 42 of the measuring chambers of the feeders.

In that the clay bulk demand of the feeders may differ considerably in accordance with the type of ware for which the charges are intended, valve means is provided for regulating the flow of clay into the chambers thereof to insure that the filling of all of them will be initiated simultaneously and concluded simultaneously to reduce chamber filling time to a minimum extent and thereby increasing manifold filling time to a maximum extent for each cycle of operation of the machine. As seen in Figs. 2, 3, 5, 6 and 7, said valves means comprises upper and lower slide valve members 117 and 118 in the form of vertical plates arranged for vertical adjustment with respect to each other, in between the inlet 42 of each measuring chamber and its adjacent outlet 112 of the manifold to provide a port or passage 118a therebetween which may be varied in area in accordance with the demand of the measuring chamber. The valve plates are mounted for adjustment between guide portions 118b of the feeder frame 28 and the front wall of the manifold. Each valve plate is adjusted by an adjusting screw 118c threaded into a wall portion of the manifold and having a reduced neck portion 118d received in a slot 118e in an angular end portion 118f of each plate. These valve members 117 and 118 may be employed supplementary to the varying throats 115, or they may be substituted for the throats, if desired, and under certain conditions, only one of the members may be required to effect the proper result.

Clay progressing pressure will cease and movement of the clay through manifold outlets will be halted prior to and during the opening of the gates, the ejection of the charges, and closing of the gates. This prevents the clay from gushing through the outlets and nozzles of the measuring chambers between the time the gates are opened and the plungers descend sufficiently to close the outlets, to insure that only such clay as is confined in the chambers will be ejected therefrom.

Immediately after the clay is packed solidly in the measuring chambers, the pulsators 119 which force clay into the measuring chambers, are deflated, and immediately thereafter the gates are opened, the plungers lowered and raised and the gates closed, preferably all in very rapid succession, whereby the charge of clay will be quickly deposited onto the ware forming surface of the molds therebelow. It is preferred to lower the plungers after the supplemental pressure delivered by the pulsators has been relaxed so as to remove side thrust of the plunger and prevent wear.

Figure 12:
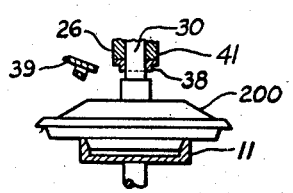
Fig. 12 illustrates the operation of applying a charge of clay to a mold.

As seen in Fig. 12, when the mold is raised by the chuck 11, it is held in predetermined elevated position in co-axial alignment with the outlet nozzles of the measuring chambers, whereby as the feeder plunger is lowered, the rounded clay charge is ejected thereby from the chamber and compressed onto the molding surfaces 200 of the mold in exact co-axial alignment therewith and assume a doughnut-like shape presenting a rounded ring-like peripheral portion connected by a thin depressed central flat portion.

By so definitely shaping and measuring the charge bulk before it is exposed to atmosphere, then gripping it incident to its being deposited onto a molding surface, then spreading and reforming thereon to a predetermined shape optimum to final definite marginal spreading, and incident thereto pressing the charge into adhering connection with the mold to prevent its displacement thereon while being rapidly transported to and operated upon by a final spreading definitely contoured die, insures spreading the charge radially to a uniform and optimum extent and thickness for jiggering without providing the conventional 35 per cent excess clay bulk in each charge to insure full mold coverage and adequate blank thickness capable of resulting in a perfect article after jiggering. Thus, the apparatus may meet the requirements of maximum mass production with a minimum amount of clay supply due to the manner in which the clay supply is conserved.

Figure 15:
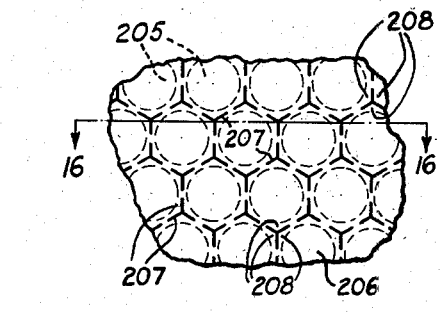
Fig. 15 is an enlarged fragmentary detail of the clay engaging surface of the form of permeable end part of the plunger shown in Fig. 16.
Figure 16:
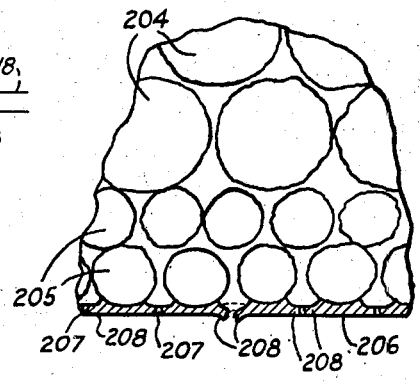
Fig. 16 is a section taken on line 16—16 of Fig. 15.

The invention contemplates a form of construction for the permeable end parts of the charger plungers wherein the minute pores in the clay engaging surface thereof will not tend to become clogged with very small particles of clay and reduce the permeability of the parts. This form of construction is shown in Figs. 16, 14 and 15, and comprises an interior body portion 204 made up of a course grained material, such as, .030" round sand particles, over which is provided a thin exterior layer 205 of very fine grained material, such as .002" round sand particles, which latter and former sand particles are held together by a minimum amount of binder to increase the permeability of the part. To further insure against cloggage of the very small pores of the exterior layer by particles of clay, this layer may be provided with a very thin and finely reticulated facing 206 of resilient material capable of checking the intrusion of very small clay particles therethrough. This facing may be in the form of a thin adhesive coating of rubber elastic paint, or the like, which, incident to drying, is subjected to air, under pressure, passed through the end part from the back thereof to cause those portions of the layer between the fine sand particles of the exterior layer to burst and thus form intersecting cracks 207 therein to provide very minute valve-like flaps 208 arranged to prevent clay particles from passing through the layer while allowing air, under pressure, to pass therethrough during ejection of a clay charge therefrom. Furthermore, this reticulated facing would also be very effective to prevent intrusion of clay particles into the body of the end part in the event it is desired to vacuumize the measuring chamber by way of said part to insure the complete filling of the chamber and the expedition of the filling operation. The reticulated facing may also be in the form of a thin covering of organic or inorganic material, such, as, for example, filter cloth, leather, metallic or fabric gauze or the like.

This form of plunger end construction also has the advantage of presenting less resistance to the air passing therethrough than it would if the part was entirely constructed of fine-grained material, whereby said construction becomes very suitable for such end parts that have a considerable mass of body portion, as that seen in Fig. 16.

As to the charge producing capacity of the apparatus, a normal output of from 20 to 25 charges per minute may be expected. Although, the figures given are not absolute for obvious reasons, this rate of output for a single feeder would provide a cycle of about three seconds for a feeding operation.

It is therefore preferred that the filling of the measuring chambers occupy a shorter period of each cycle than that allotted for replenishing the quantity of clay removed from the manifold to the measuring chambers. The reason for allowing more time for manifold filling is that during the time the measuring chambers are being filled the flow of clay into the manifold may be slowed down, stopped or even reversed, depending on whether the auger pressure is greater than, equal to, or less than the manifold pressure. Any slowing down or interruption of the steady flow of clay into the manifold will require more time to deliver an amount of clay equal to that displaced, because of the lost motion.

What I claim is:

1. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the extent of reciprocation of said member while in operation.

2. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the extent of reciprocation while the driving connection subsists between the member and the actuating means therefor.

3. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the uppermost limit of movement of said member while in operation.

4. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the uppermost limit of movement of said member while the driving connection subsists between the member and the actuating means therefor.

5. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the lowermost limit of movement of said member while in operation.

6. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the lowermost limit of movement while the driving connection subsists between the member and the actuating means therefor.

7. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and independent means for adjusting the uppermost limit of movement and the lowermost limit of movement of the member, respectively, while in operation.

8. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and independent means for adjusting the uppermost limit of movement and the lowermost limit of movement of the member, respectively, while the driving connection subsists between the member and the actuating means therefor.

9. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the extent of reciprocation and the uppermost and lowermost limit of reciprocation of the member while in operation.

10. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the extent of reciprocation and the uppermost and lowermost limit of reciprocation of the member while the driving connection subsists between the member and the actuating means therefor.

11. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the extent of reciprocation and the uppermost limit of movement of the member while in operation.

12. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the extent of reciprocation and the uppermost limit of movement of the member while the driving connection between the member and its actuating means subsists.

13. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the extent of reciprocation and the lowermost limit of movement of the member while in operation.

14. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for adjusting the extent of reciprocation and the lowermost limit of movement of the member while the driving connection subsists between the member and its actuating means.

15. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for varying the capacity of the measuring chamber while the apparatus is in operation.

16. In apparatus for feeding charges of plastic clay to pottery molds, a charge measuring chamber having an inlet and a discharge outlet, a reciprocable member adapted to deliver the clay in charges through said outlet, a closure for said outlet movable into and out of closed relation therewith, means for reciprocating said member operable to actuate said closure and means for varying the capacity of the measuring chamber while the member is in operation to deliver charges of clay through the outlet and while the driving connection between the member and the actuating means therefor subsists.

17. In apparatus for feeding charges of plastic clay to pottery molds, a charge measuring chamber having an inlet and an outlet, a reciprocable member adapted to deliver charges of clay through said outlet, a closure for said outlet movable into and out of closed relation therewith, means for reciprocating said member operable to actuate said closure in predetermined timed relation to the movement of the member and means for varying the movement of the member while in operation.

18. In apparatus for feeding charges of plastic clay to pottery molds, a charge measuring chamber having an inlet and an outlet, a reciprocable member adapted to deliver charges of clay through said outlet, a closure for said outlet movable into and out of closed relation therewith, means for reciprocating said member operable to actuate said closure in predetermined relation to the movement of the member and means for varying the movement of the member while the driving connection subsists between the member and its actuating means.

19. In apparatus for feeding charges of clay to pottery molds, a charge measuring chamber having an inlet and an outlet, a reciprocable plunger having a permeable clay engaging end part for delivering charges of clay through said outlet, a closure movable into and out of closed relation with said outlet, means for reciprocating said plunger operable to actuate said closure and means for directing air under pressure through the permeable end part during the final charge expelling movement of the plunger to repel the clay charge therefrom.

20. In apparatus for feeding charges of plastic clay to pottery molds, a charge measuring chamber having an inlet and an outlet, a reciprocable member for delivering charges of clay therethrough having a permeable end part with a reticulated clay engaging surface capable of precluding the entry of clay thereinto and through which air under pressure is delivered during final charge expelling movement of the member, a closure movable into and out of closed relation with the outlet and means for reciprocating the member operable to actuate said closure.

21. In apparatus for feeding charges of plastic clay to pottery molds, a charge measuring chamber having an inlet and an outlet, a reciprocable member for delivering charges of clay therethrough having a permeable end part composed of coarse grained material and a thin outer body portion of a finer grained material, to preclude entry of clay particles and through which air under pressure is delivered during final charge expelling movement of the member to release the clay charges therefrom and through which vacuum may be applied to the charge measuring chamber upon final upward movement of the member, a closure for said outlet movable into and out of closed relation therewith and means for reciprocating said member operable to actuate said closure.

22. In apparatus for feeding charges of plastic clay to pottery molds, a charge measuring chamber having an inlet and an outlet, a reciprocable member for delivering charges of clay through said outlet, a closure for said outlet movable into and out of closed relation with said outlet, cam actuated means for operating said closure, and means for actuating said member operable to actuate said cam actuated means.

23. In apparatus for feeding charges of clay to pottery molds, a charge measuring chamber having an inlet and an outlet, a reciprocable plunger for delivering charges of clay through said outlet, a closure for said outlet movable into and out of closed relation therewith and means for reciprocating said plunger operable to actuate asid closure including action delaying means whereby the closure is withdrawn from the outlet before the charge is delivered therethrough and the plunger is withdrawn from the outlet before the closure is moved into closed relation with the outlet.

24. In apparatus for feeding charges of clay to pottery molds, a charge measuring chamber having an inlet and an outlet, a reciprocable plunger for delivering charges of clay through said outlet, a closure, movable into and out of closed relation with said outlet, and means for reciprocating said plunger operable to actuate said closure including a lost motion connection and cam means which enables plunger dwell periods between movements of the closure.

25. In apparatus for feeding charges of clay to pottery molds, a charge measuring chamber having an inlet and an outlet, a reciprocable plunger for delivering charges of clay through said outlet, a closure, cam actuated means for moving said closure into and out of closed relation with said outlet, and fluid operated means for reciprocating said plunger operable to actuate said cam actuated means.

26. In apparatus for feeding charges of clay to pottery molds, a charge measuring chamber having an inlet and outlet, a reciprocable plunger for delivering charges of clay through said outlet, a closure for said outlet movable into and out of closed relation therewith, means for varying the uppermost limit of movement of said plunger to thereby vary the capacity of the charge measuring chamber and the length of the clay charge, means for visibly indicating the length of the charge and means for reciprocating said plunger operable to actuate said closure.

WILLIAM J. MILLER.